United States Patent
Rumpel et al.

(10) Patent No.: US 11,053,982 B2
(45) Date of Patent: Jul. 6, 2021

(54) METHOD AND DEVICE FOR ASSEMBLY OF AN ANGULAR CONTACT ROLLER BEARING

(71) Applicant: Schaeffler Technologies AG & Co. KG, Herzogenaurach (DE)

(72) Inventors: Reinhard Rumpel, Rottendorf (DE); Heinrich Hofmann, Schweinfurt (DE); Ernst Geiger, Hallerndorf (DE); Rainer Eidloth, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 185 days.

(21) Appl. No.: 16/323,127

(22) PCT Filed: Jun. 19, 2017

(86) PCT No.: PCT/DE2017/100506
§ 371 (c)(1),
(2) Date: Feb. 4, 2019

(87) PCT Pub. No.: WO2018/024279
PCT Pub. Date: Feb. 8, 2018

(65) Prior Publication Data
US 2019/0162238 A1    May 30, 2019

(30) Foreign Application Priority Data

Aug. 3, 2016    (DE) .......................... 102016214346.8

(51) Int. Cl.
*F16C 33/46*    (2006.01)
*F16C 43/08*    (2006.01)
(Continued)

(52) U.S. Cl.
CPC ............ *F16C 43/08* (2013.01); *F16C 19/364* (2013.01); *F16C 33/4605* (2013.01);
(Continued)

(58) Field of Classification Search
CPC .. F16C 33/4605; F16C 33/495; F16C 33/585; Y10T 29/53104
See application file for complete search history.

(56) References Cited

U.S. PATENT DOCUMENTS 1,212,253 A * 1/1917 Perkins ................. F16C 19/364
384/561
1,247,858 A    11/1917 Miller
(Continued)

FOREIGN PATENT DOCUMENTS

CH    463886    10/1968
DE    151483    5/1904
(Continued)

OTHER PUBLICATIONS

English translation WO 2009/121533 A2 (Year: 2009).*

*Primary Examiner* — Jason L Vaughan
*Assistant Examiner* — Amanda Kreiling
(74) *Attorney, Agent, or Firm* — Volpe Koenig

(57) ABSTRACT

A method and device for assembly of an angular contact roller bearing, including an inner bearing ring having an inner raceway arranged on the outer peripheral surface of the inner bearing ring, at an angle to the bearing rotation axis, and a rim delimiting said raceway at the smallest diameter thereof, an outer bearing ring having an outer raceway arranged on the inner peripheral surface of the outer bearing ring, also at an angle to the bearing rotation axis, and a rim delimiting the raceway at the largest diameter thereof, and a plurality of rolling element bodies, arranged between the bearing rings and rolling on the raceways thereof held at regular distances in the circumferential direction by a bearing cage. A tangent to the outer shell surface of the inner bearing ring and a tangent to the inner shell surface of the outer bearing ring are flat at least in the region of the raceways, and extend at inverse to the bearing rotation axis, and the raceways of both bearing rings are each conically formed in the peripheral surfaces such that the rims thus produced and delimiting each of the raceways on one side (Continued)

are consequently each integral with the bearing rings. The bearing is assembled according to an eccentric-pivot assembly method borrowed from the eccentric assembly method known for grooved ball bearings.

16 Claims, 8 Drawing Sheets

(51) Int. Cl.
  *F16C 19/36* (2006.01)
  *F16C 33/49* (2006.01)
  *F16C 33/58* (2006.01)
  *F16C 43/06* (2006.01)
  *F16C 9/02* (2006.01)

(52) U.S. Cl.
  CPC .......... *F16C 33/495* (2013.01); *F16C 33/585* (2013.01); *F16C 43/06* (2013.01); *F16C 9/02* (2013.01)

(56) References Cited

U.S. PATENT DOCUMENTS

| | | | |
|---|---|---|---|
| 1,397,142 A | 11/1921 | Palmgren | |
| 1,545,841 A | 7/1925 | Miller | |
| 2,042,417 A * | 5/1936 | Wise | F16C 33/495 |
| | | | 384/571 |
| 2,633,627 A | 4/1953 | Olmstead | |
| 3,420,589 A | 1/1969 | Green et al. | |
| 3,606,504 A | 9/1971 | Wojciechowski | |
| 2011/0026866 A1 | 2/2011 | Doeppling et al. | |

FOREIGN PATENT DOCUMENTS

| | | | |
|---|---|---|---|
| DE | 168499 | 3/1906 | |
| DE | 344090 | 11/1921 | |
| DE | 443593 | 5/1927 | |
| DE | 521398 | 3/1931 | |
| DE | 6917609 | 10/1969 | |
| DE | 2053470 | 9/1971 | |
| DE | 2407477 | 8/1975 | |
| DE | 3023811 | 1/1981 | |
| DE | 3004672 | 8/1981 | |
| DE | 8713057 | 12/1987 | |
| DE | 102014200665 | 7/2015 | |
| DE | 102014223708 | 5/2016 | |
| WO | 2009121533 | 10/2009 | |
| WO | WO-2009121533 A2 * | 10/2009 | F16C 33/36 |

* cited by examiner

METHOD AND DEVICE FOR ASSEMBLY OF AN ANGULAR CONTACT ROLLER BEARING

FIELD OF THE INVENTION

The invention relates to a method for assembling an, in particular, single-row angular contact anti-friction bearing which can be used, in particular, advantageously as a locating bearing for mounting the main shaft in a motor vehicle transmission. Furthermore, the invention relates to an apparatus for assembling the angular contact anti-friction bearing.

BACKGROUND

The most frequently used bearing type as a locating bearing for mounting the main shaft in a motor vehicle transmission is the single-row deep groove ball bearing, since this is distinguished by an equally high radial and axial load-bearing capability and has the highest rotational speed limits of all bearing types on account of its low friction. This deep groove ball bearing consists in a known way of an outer bearing ring and an inner bearing ring, and of a multiplicity of bearing balls which are arranged between the bearing rings and roll in groove-shaped raceways which are machined into the inner side of the outer bearing ring and into the outer side of the inner bearing ring, which bearing balls are guided at uniform spacings from one another by way of a bearing cage. Here, the insertion of the bearing balls into the deep groove ball bearing usually takes place by way of the eccentric assembly method which was disclosed in DE 168 499 A1 and in the case of which the two bearing rings are arranged eccentrically with respect to one another and the free space between the bearing rings which is produced as a result is filled with the bearing balls, subsequently the bearing rings are moved into a concentric position with respect to one another utilizing their elasticity and, after a uniform circumferential distribution of the bearing balls, the bearing cage is inserted.

It has been proven in practice, however, that deep groove ball bearings of this type always have certain limitations, above all in relation to the radial load-bearing capability of the bearing, on account of the low maximum number of bearing balls which can be installed, which number is dependent on the dimensions of the inner and the outer bearing ring and on the diameter of the bearing balls. A multiplicity of solutions have therefore been proposed in the past, such as an unenclosed filling opening in accordance with DE 151 483 A1 which is arranged in the opposite rims of the raceways of the outer and the inner bearing ring, or a closable filling opening of similar configuration in accordance with DE 24 07 477 A1, by way of which an increase in the radial load-bearing capability of deep groove ball bearings should be achieved by way of an increase in the number of ball bearings, but which did not become established in practice on account of the disadvantages which result from filling openings of this type.

Another obvious possibility of increasing the load-bearing capability of the locating bearing for mounting the main shaft in a motor vehicle transmission would be the replacement of the previously used deep groove ball bearing with a cylindrical roller bearing of the NUP type, as known, for example, from the "anti-friction bearings" catalog of the applicant from October 2008 on pages 393 and 396. This cylindrical roller bearing has two lateral rims both on the inner bearing ring and on the outer bearing ring, and is suitable for absorbing high radial loads and axial loads in both directions. Cylindrical roller bearings of this type have very high production costs, however, as a result of the high proportion of machining, in particular in the case of the raceway production and in the case of the rim machining, and their load-bearing capability would in turn be overdimensioned, with the result that they are ultimately unsuitable for use as locating bearings in motor vehicle gearboxes.

A further bearing type which is suitable as a locating bearing for mounting the main shaft in a motor vehicle transmission, forms the closest prior art to the present invention, and the absorption capacity of radial forces and of axial forces in both directions of which is greater than that of deep groove ball bearings has been disclosed by documents DE 6 917 609 U and CH 463 886 A. These documents in each case disclose an angular contact anti-friction bearing which consists substantially of an inner bearing ring with an inner raceway which is arranged on its outer peripheral surface obliquely with respect to the radial bearing axis and a rim which delimits said raceway at its smallest diameter, of an outer bearing ring with an outer raceway which is likewise arranged on its inner peripheral surface obliquely with respect to the radial bearing axis and a rim which delimits said raceway at its greatest diameter, and of a multiplicity of anti-friction rolling bodies which are arranged between the bearing rings, roll on their raceways, and are held at uniform spacings from one another in the circumferential direction by way of a bearing cage. In order to facilitate the insertion of the rolling bodies which are configured as tapered rollers into the bearing cage which is configured in each case as a pocket-type cage or as a window cage, the rim in the case of the angular contact anti-friction bearing in accordance with DE 6 917 609 U is configured on the inner bearing ring as a separate component and the rim in the case of the angular contact anti-friction bearing in accordance with CH 463 886 A is configured on the outer bearing ring as a separate component which is fastened to the inner and outer bearing ring after the assembly of the bearing. In the case of the angular contact anti-friction bearing in accordance with DE 6 917 609 U, this takes place by way of a separate slotted ring of U-shaped cross section, the radial legs of which engage into corresponding grooves in the rim and in the inner bearing ring, and, in the case of the angular contact anti-friction bearing in accordance with CH 463 886 A, by way of a circumferential collar which is integrally formed on the underside of the rim and which is pressed into the outer bearing ring.

In the case of angular contact anti-friction bearings of this type, although, by virtue of the fact that only one of the bearing rings is configured in one piece with only one lateral rim, the proportion of the machining in the case of the raceway production and in the case of the rim machining and therefore also the overall costs for the bearing production are substantially lower than in the case of the above-described cylindrical roller bearing, the configuration of the rim on the respective other bearing ring as a separate rim disk, its additional assembly on said bearing ring and the required precision production of the bearing faces thereon and the associated bearing ring in the case of said angular contact anti-friction bearings nevertheless have an unfavorable effect on their production costs. Moreover, there is the risk in the case of said angular contact anti-friction bearings that the fastening of the separate rim disk is not sufficient to also withstand high radial or axial load peaks, with the result that the rim disk can become detached during bearing operation and a bearing failure ultimately occurs.

SUMMARY

Proceeding from the described disadvantages of the solutions of the known prior art, the invention is therefore based on the object of facilitating simple and inexpensive assembly of an, in particular, single-row angular contact anti-friction bearing with rims which in each case delimit the raceway.

According to the invention, this object is achieved by way of a method and by way of an apparatus having one or more features of the invention. Advantageous developments of the invention can be gathered from the following description and claims.

Angular contact anti-friction bearings which are assembled by way of the methods according to the invention are distinguished by the fact that a tangent on the outer peripheral surface of the inner bearing ring and a tangent on the inner peripheral surface of the outer bearing ring are formed flat at least in the region of the raceways and are configured so as to run in opposite directions obliquely with respect to the bearing rotational axis, and the raceways of the two bearing rings are machined in each case in a conical manner into said peripheral surfaces, and that the rims which are produced in the process and delimit the raceways in each case on one side are configured in each case in one piece with the bearing rings as a result.

It is preferably provided that the anti-friction rolling bodies are preferably configured as tapered rollers which have a cone angle in the range from 2° to 6° and roll on their raceways in an envelope circle angle between 7° and 20°. If the angular contact anti-friction bearing is used as a locating bearing for mounting the main shaft in a motor vehicle transmission, a cone angle between 3° and 5°, but preferably of 4°, and an envelope circle angle between 12° and 16°, but preferably of 14°, have proven particularly suitable here due to the radial and axial loads which occur. It is to be noted, however, that the configuration according to the invention is not to be restricted to a tapered roller bearing, since other anti-friction bearings with roller axes which are arranged obliquely with respect to the bearing center axis can also be configured in the same way. Thus, instead of the tapered rollers which are described by way of example, cylindrical rollers or needles or rollers with spherical peripheral surfaces, such as self-aligning rollers or barrel-type rollers, can be used.

Furthermore, it is advantageous that the gap which exists on the smaller diameter side of the anti-friction rolling bodies between the bearing rings is configured to be smaller than the gap which exists on the larger diameter side of the anti-friction rolling bodies between the bearing rings, and is dimensioned in such a way that twice its magnitude is greater than the largest diameter of the anti-friction rolling bodies. Dimensioning of this type of the gap between the inner and the outer bearing ring is necessary, in order to facilitate the insertion of the anti-friction rolling bodies into the angular contact anti-friction bearing in accordance with the assembly method which is described.

Moreover, it is advantageous that the rim which delimits the raceway in the inner bearing ring has a minimum height of between 31% and 35%, preferably of approximately 33%, and the rim which delimits the raceway in the outer bearing ring has a minimum height of between 19% and 23%, preferably of approximately 21%, of the largest diameter of the anti-friction rolling bodies. A configuration of this type of the rims and the associated raceway depth ensures that high axial forces which occur during bearing operation can be absorbed in the one direction with as little rim friction as possible, whereas lower axial forces are absorbed in the other direction via the oblique raceways.

Furthermore, it is advantageous if, after the assembly of the anti-friction rolling bodies, a cone-type cage which consists of a cage ring and a multiplicity of axial cage crosspieces is inserted into the angular contact anti-friction bearing. On its cage crosspieces, said bearing cage additionally has a plurality of latching lugs which are circumferentially distributed uniformly, have a smaller inside diameter than the cage ring, and by way of which the bearing cage can be positionally fixed axially on the inner face of the rim on the inner bearing ring. During the insertion of the bearing cage into the angular contact anti-friction bearing, said latching lugs are first of all deformed elastically in the direction of the cage crosspieces until they latch behind the rim on the inner bearing ring during the insertion of the bearing cage from the small diameter side of the tapered rollers. As a result, the bearing cage which has been positionally fixed up to now only in the one axial direction by way of the bearing cage bearing against the one end sides of the anti-friction rolling bodies is also positionally fixed in the other axial direction. It is also to be noted here, however, that the use of a comb-type cage as a bearing cage is not restricted to said cage type, since it is also possible to configure the bearing cage as a two-piece riveted sheet metal cage.

According to the invention, the stated object is achieved by way of a method for assembling an angular contact anti-friction bearing, which method is distinguished by the fact that the angular contact anti-friction bearing is assembled in accordance with an eccentric/pivot assembly method which is borrowed from the eccentric assembly method which is known for deep groove ball bearings.

In the case of said eccentric/pivot assembly method, in a first step, the outer bearing ring is inserted, with its rimless end first, into a receptacle in an at least approximately vertical position and, by way of application of force on a 12 o'clock line toward a 6 o'clock line on its outer peripheral surface, is made slightly oval within its elastic limit at its outer peripheral surface.

Afterward, in a second step, the anti-friction rolling bodies are filled either individually or as a roller set which has already been prefixed in a horseshoe-shaped manner in an auxiliary apparatus, with their larger end sides first, from the end side of rimless configuration of the outer bearing ring into the raceway of the outer bearing ring.

As a third step, the inner bearing ring is then fed to the outer bearing ring in an automatically sliding manner, with the rimless end resting on an inclined plane, such that it comes into contact by way of two opposite points of its race with two contact points on the running faces of two anti-friction rolling bodies.

In a fourth step, the inner bearing ring then swivels about a horizontal axis which is formed between its contact points on the anti-friction rolling bodies into the outer bearing ring into a perpendicular position with respect thereto by way of a centrifugal force which results from its acceleration on an inclined plane, in which perpendicular position the rim of the inner bearing ring bears at least in sections against the smaller end sides of the anti-friction rolling bodies.

Subsequently, in a fifth step, the inner bearing ring is displaced into a coaxial position with respect to the outer bearing ring, and the anti-friction rolling bodies are circumferentially distributed uniformly in their raceways in the bearing rings with cancelation of the ovalization of the outer bearing ring.

Afterward, in a sixth step, the bearing cage which is configured as a comb-type cage is introduced with its cage crosspieces between the anti-friction rolling bodies either from the side with their smaller end sides, and is latched on the inner bearing ring on the inner face of the rim, or, as claimed in claim 8, is introduced from the side with their larger end sides, and is latched on the outer bearing ring on the inner face of the rim.

Finally, the stated object is also achieved by way of an apparatus for carrying out the described eccentric/pivot assembly method.

Accordingly, it is provided that the assembly apparatus substantially comprises a perpendicular receiving part for holding the outer bearing ring and for filling it with the anti-friction rolling bodies, and of a ramp part which is arranged opposite the receiving part and in an inclined manner with respect thereto for feeding the inner bearing ring to the outer bearing ring.

In one specific refinement, the receiving part preferably has an L-shaped profile cross section with a horizontal or approximately horizontal leg and a vertical or approximately vertical leg.

Moreover, the assembly apparatus which is configured according to the invention is also distinguished by the fact that the surface of the horizontal leg is configured with a concave shaped-out formation which runs to the vertical leg for receiving a loose securing ring for the outer bearing ring in an upright manner, and that the vertical leg is configured with a circular aperture with at least approximately the size of the inside diameter of the outer bearing ring, through which aperture the anti-friction rolling bodies can be introduced into the raceway of the outer bearing ring 6.

Furthermore, it is one expedient development of the assembly apparatus according to the invention that two stop webs which are arranged offset with respect to one another approximately by 190° and protrude into the loose securing ring are fastened in the aperture of the vertical leg, between which stop webs the roller set which is fed to the outer bearing ring can be fixed positionally in the latter.

It is a further feature of the assembly apparatus according to the invention that a device for producing a vertical pressure force for the ovalization of the outer bearing ring is fastened to the free end of the vertical leg at the height of the 12 o'clock line of the peripheral surface of the loose securing ring. Here, for example, a sleeve which is configured with an internal thread and in which a setting screw is arranged in a rotatably movable manner has proven to be particularly suitable.

Finally, it is also provided that the ramp part of the assembly apparatus has an inclined planar sliding track with two lateral guide rims, the spacing of which from one another corresponds approximately to the outside diameter of the inner bearing ring. This has proven to be advantageous, in order to allow the inner bearing ring to slide exactly into the inside diameter of the outer bearing ring. Here, the securing ring-side end of the sliding track is fastened on two bearing blocks which can be fixed via a pin connection on the surface of the horizontal leg of the receiving part in such a way that the sliding track can be removed with said bearing blocks from the receiving part.

In summary, the angular contact anti-friction bearing which is assembled according to the invention therefore has the advantage in comparison with the angular contact anti-friction bearings which are known from the prior art that it has a higher load-bearing capability, despite the maximum achievable rolling body filling degree by way of the eccentric/pivot assembly method of approximately 60%, than an identically assembled single-row deep groove ball bearing, since the anti-friction rolling bodies which are used are no longer in point contact, as in the case of bearing balls, but rather are in linear contact with their raceways. Here, with regard to the load-bearing capability which can be achieved, an angular contact anti-friction bearing which is configured according to the invention, as a completely new bearing type [for example, ARU (Angular Roller Unit) 207 model range=40 kN], ranks approximately in the middle between the load-bearing capability of a single-row deep groove ball bearing [for example, 6207 model range=25.5 kN] and the load-bearing capability of a single-row cylindrical roller bearing [for example, NUP 207E model range=56 kN]. Moreover, separate rim disks are no longer necessary as a result of the rims which are configured in one piece with the bearing rings, with the result that the angular contact anti-friction bearing which is assembled according to the invention is distinguished overall by a low assembly complexity and therefore by low overall costs for the bearing production.

BRIEF DESCRIPTION OF THE DRAWINGS

One preferred embodiment of an angular contact anti-friction bearing, a method for assembling it and an apparatus for carrying out said method will be described in greater detail in the following text with reference to the appended drawings, in which.

DETAILED DESCRIPTION

Figure 1:
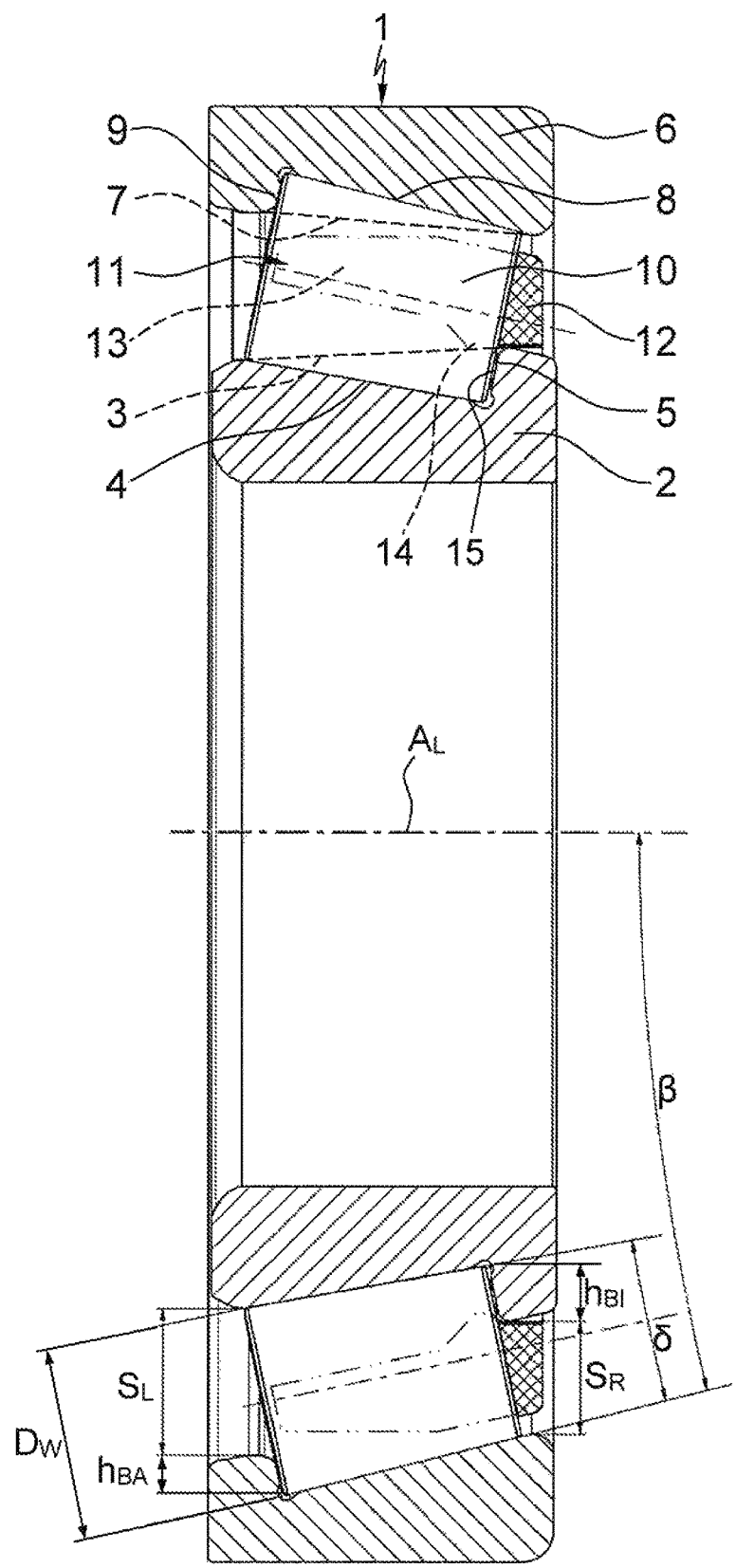
FIG. 1 shows an enlarged illustration of a cross section through a single-row angular contact anti-friction bearing with rims which are configured in one piece with the bearing rings.

FIG. 1 shows a cross section of a single-row angular contact anti-friction bearing 1 which is suitable, for example, as a replacement of the previously used deep groove ball bearing for mounting the crankshaft in motor vehicle internal combustion engines. As can be clearly seen, said angular contact anti-friction bearing 1 comprises an inner bearing ring 2 with an inner raceway 4 which is arranged on its outer peripheral surface in a manner which is inclined with respect to the bearing rotational axis $A_L$ and is delimited at its smallest diameter by way of a rim 5, and of an outer bearing ring 6 with an outer raceway 8 which is arranged on its inner peripheral surface likewise in a manner which is inclined with respect to the bearing rotational axis $A_L$ and is delimited at its greatest diameter by way of a rim 9. Moreover, a multiplicity of anti-friction rolling bodies 10 which roll on the raceways 4, 8 of the bearing rings 2, 6 are arranged between said bearing rings 2, 6, which anti-friction rolling bodies 10 are held at uniform spacings from one another in the circumferential direction by way of a bearing cage 11.

Furthermore, it can be seen in FIG. 1 that a tangent 3 on the outer peripheral surface of the inner bearing ring 2 and a tangent 7 on the inner peripheral surface of the outer bearing ring 6 are formed flat at least in the region of the raceways 4, 8 and are configured so as to run in opposite directions obliquely with respect to the bearing rotational axis $A_L$, and the raceways 4, 8 of the two bearing rings 2, 6 are machined in each case in a conical manner into said peripheral surfaces. The rims 5, 9 which are produced in the process and delimit the raceways 4, 8 in each case on one side are configured in each case in one piece with the bearing rings 2, 6 as a result.

It can likewise be seen from FIG. 1 that the anti-friction rolling bodies 10 are configured as tapered rollers which have a cone angle δ of preferably 4° and roll in an envelope circle angle β of preferably 14° on their raceways 4, 8. Moreover, the gap $S_R$ which exists on the smaller diameter side of the anti-friction rolling bodies 10 between the bearing rings 2, 4 is configured to be smaller than the gap $S_L$ which exists on the larger diameter side of the anti-friction rolling bodies 10 between the bearing rings 2, 4, and is dimensioned in such a way that twice its magnitude is greater than the largest diameter $D_W$ of the anti-friction rolling bodies 10, in order to facilitate the insertion of the anti-friction rolling bodies 10 into the angular contact anti-friction bearing 1 in accordance with the assembly method which is described in greater detail in the following text. In addition, the rim 5 which delimits the raceway 4 in the inner bearing ring 2 has a minimum height $h_{BI}$ of approximately 33%, and the rim 9 which delimits the raceway 8 in the outer bearing ring 6 has a minimum height $h_{BA}$ of approximately 21% of the largest diameter $D_W$ of the anti-friction rolling bodies 10, in order for it to be possible for high axial forces which occur during bearing operation to be absorbed in the one direction with rim friction which is as low as possible.

Finally, it can also be seen in FIG. 1 that the bearing cage 11 is preferably formed by way of a comb-type cage which can be inserted into the radial anti-friction bearing 1 after the assembly of the anti-friction rolling bodies 10. Here, the bearing cage 11 which consists of a cage ring 12 and a multiplicity of axial cage crosspieces 13 has, on its cage crosspieces 13 which are shown in a concealed manner, a plurality of latching lugs 14 (likewise shown in a concealed manner) which are circumferentially distributed uniformly, have a smaller inside diameter than the cage ring 12, and by way of which the bearing cage 11 can be positionally fixed axially on the inner face 15 of the rim 5 on the inner bearing ring 2.

Figure 2A:
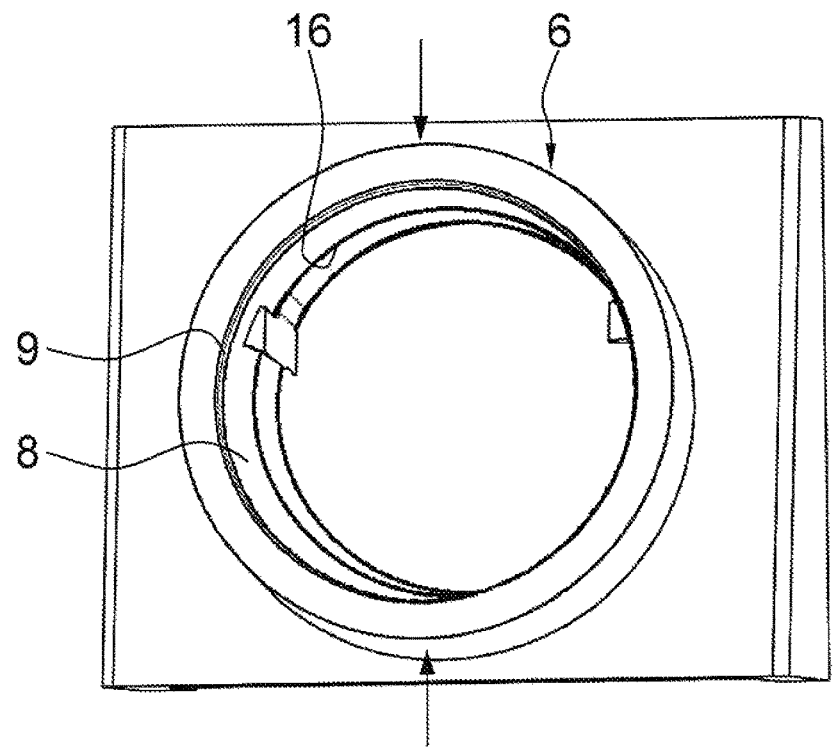
FIGS. 2A, 2B show a three-dimensional illustration of the first step of the assembly method according to the invention in a plan view and a sectional view.
Figure 2B:
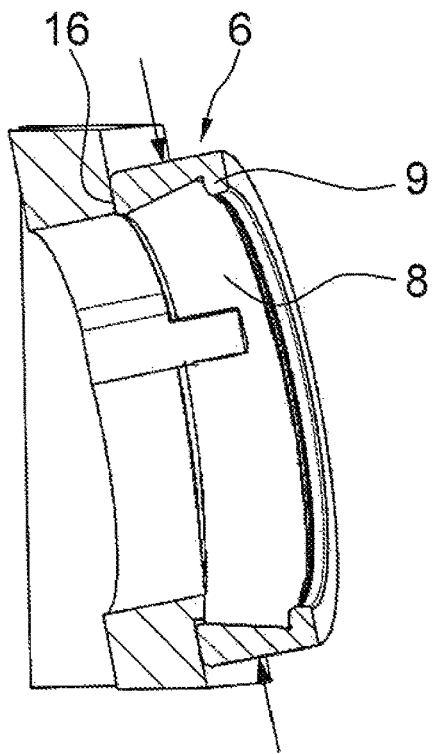

Furthermore, FIGS. 2A to 7B diagrammatically show the individual steps of an assembly method for the angular contact anti-friction bearing 1 according to the invention. This assembly method is essentially an eccentric/pivot assembly method which is borrowed from the eccentric assembly method which is known for deep groove ball bearings, in the case of which eccentric/pivot assembly method, as can be seen in FIGS. 2A and 2B, in a first step, the outer bearing ring 6 is inserted, with its rimless end 16 first, into a receptacle in an at least approximately vertical position and, by way of a force applied at a 12 o'clock line (identified in the drawing by an arrow) toward a 6 o'clock line (likewise identified by an arrow), on its outer peripheral surface 17, is ovalized slightly within its elastic limit at its outer peripheral surface 17.

Figure 3A:
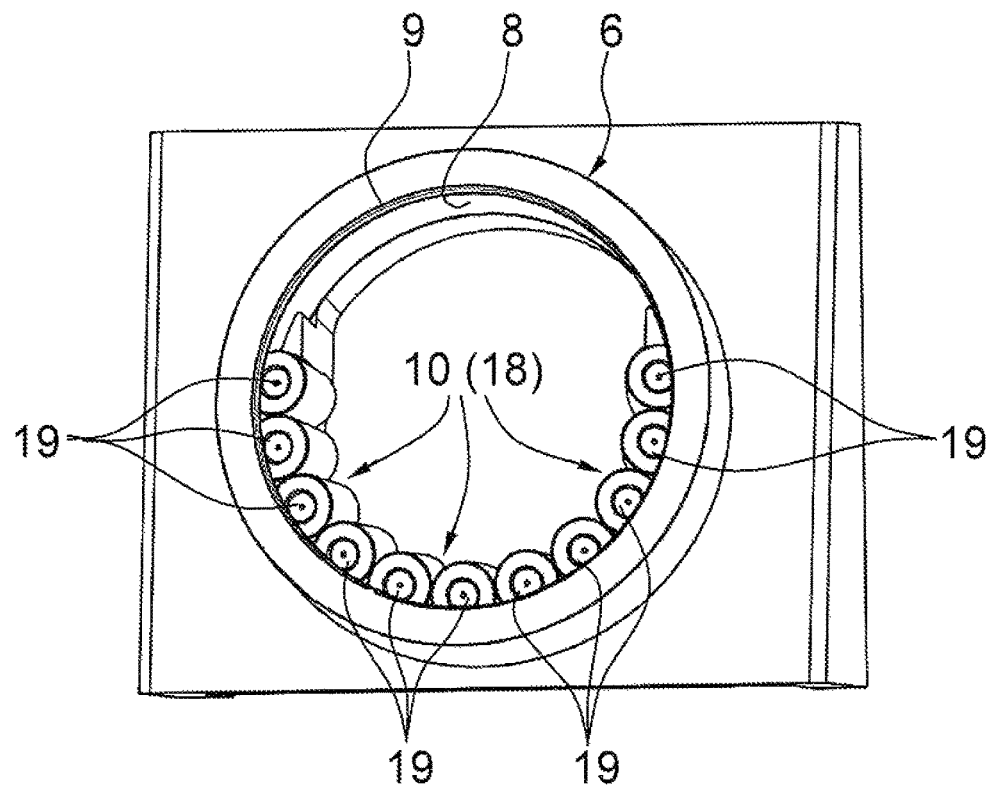
FIGS. 3A, 3B show a three-dimensional illustration of the second step of the assembly method according to the invention in a plan view and a sectional view.
Figure 3B:
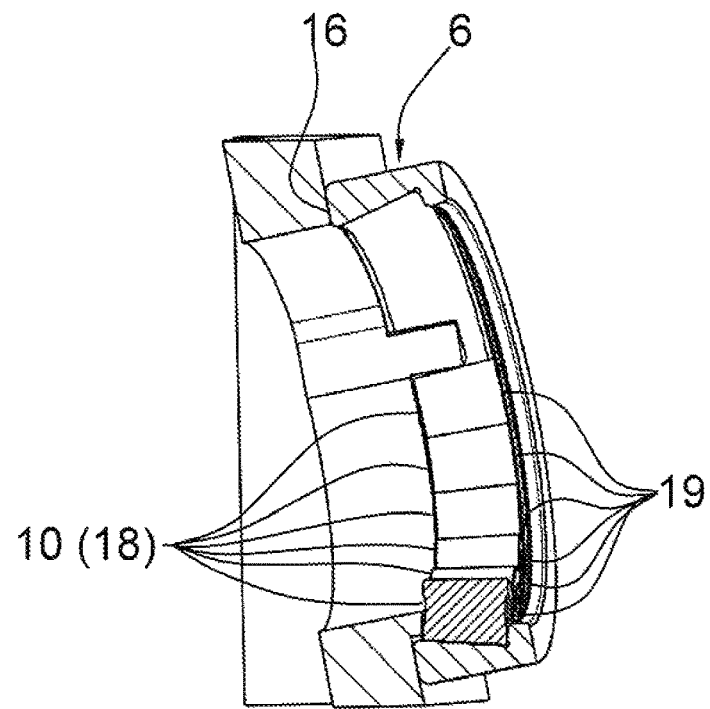

Afterward, in a second step which is depicted in FIGS. 3A and 3B, the anti-friction rolling bodies 10 are filled either individually or as a roller set 18 which has already been prefixed in a horseshoe-shaped manner in an auxiliary apparatus (not depicted), with their larger end sides 19 first, from the end side 16 of rimless configuration of the outer bearing ring 6 into the raceway 8 of the outer bearing ring 6.

Figure 4A:
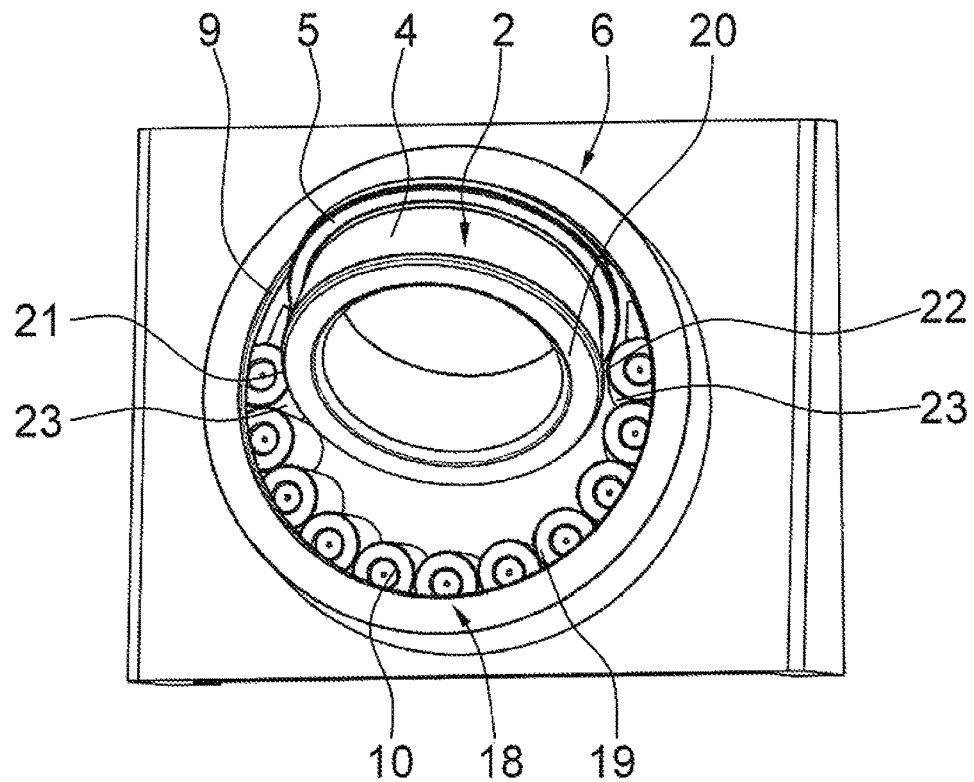
FIGS. 4A, 4B show a three-dimensional illustration of the third step of the assembly method according to the invention in a plan view and a sectional view.
Figure 4B:
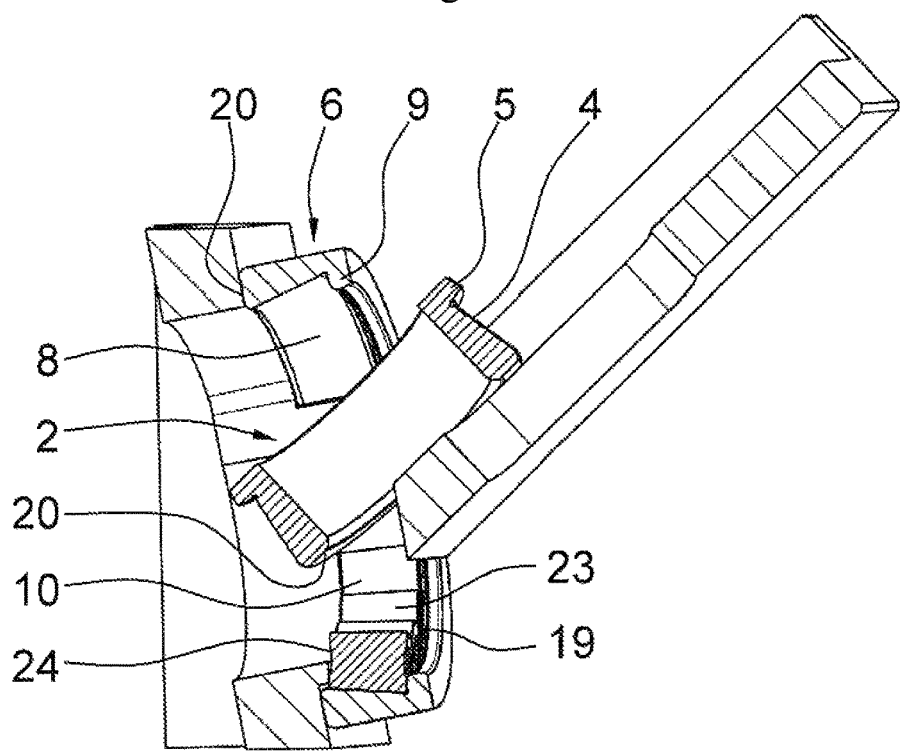

In a third step which can be seen from FIGS. 4A and 4B, the inner bearing ring 2 is then fed, in a manner which lies with its end side 20 of rimless configuration on an inclined plane, to the outer bearing ring 6 in an automatically sliding manner such that it comes into contact by way of two opposite points of its raceway 4 with two contact points 21, 22 on the running faces 23 of two anti-friction rolling bodies 10.

Figure 5A:
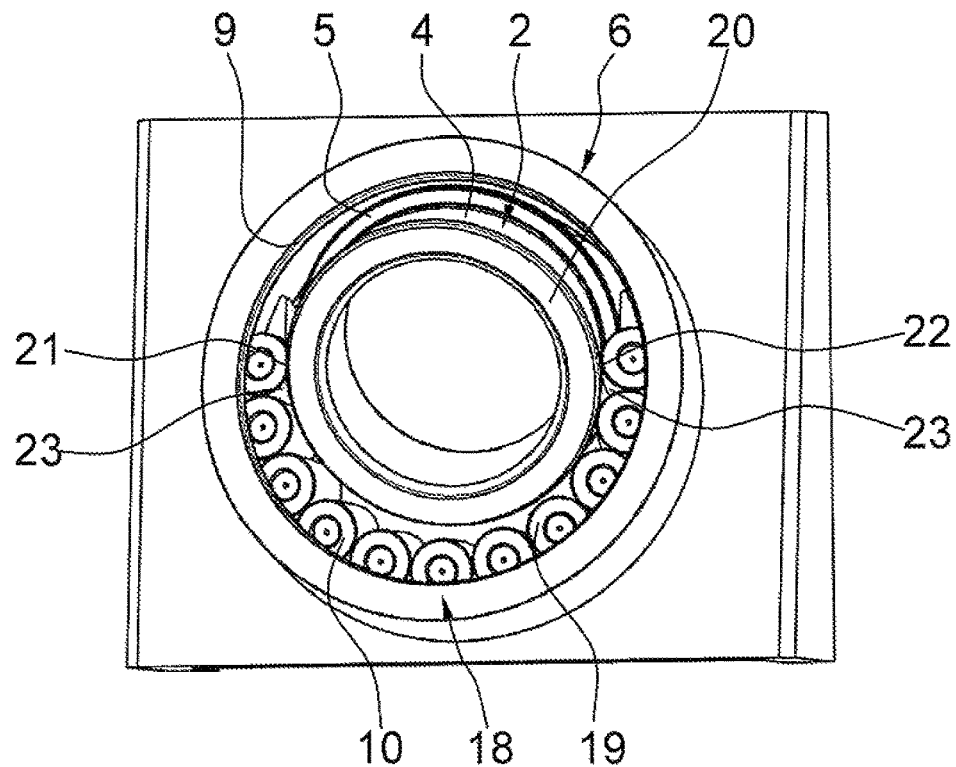
FIGS. 5A, 5B show a three-dimensional illustration of the fourth step of the assembly method according to the invention in a plan view and a sectional view.
Figure 5B:
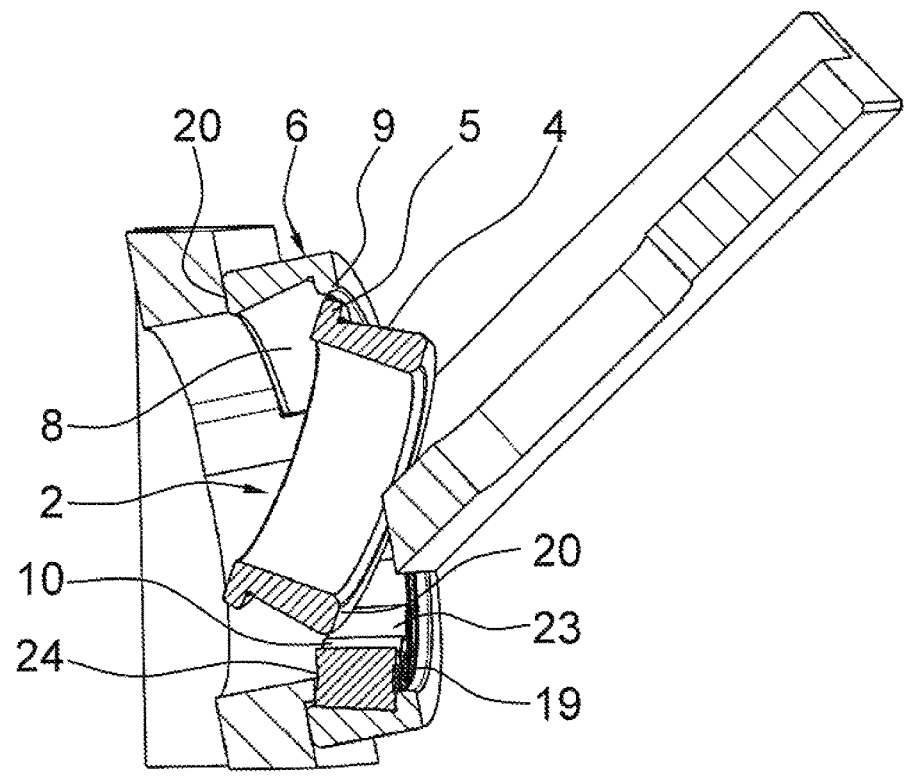

Afterward, as a fourth step which is shown in FIGS. 5A and 5B, the inner bearing ring 2 swivels about a horizontal axis which is formed between its contact points 21, 22 on the anti-friction rolling bodies 10 into the outer bearing ring 6 into a perpendicular position with respect thereto by way of a centrifugal force which results from its acceleration on an inclined plane, in which perpendicular position the rim 5 of the inner bearing ring 2 bears at least in sections against the smaller end sides 24 of the anti-friction rolling bodies 10.

Figure 6A:
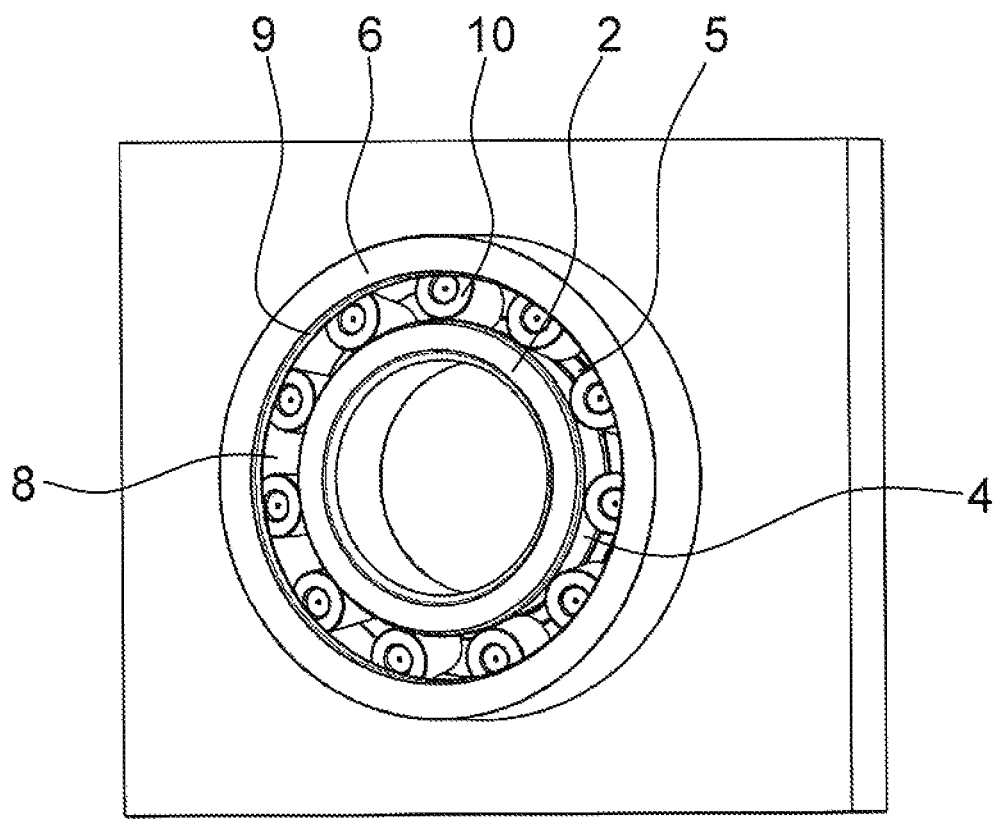
FIGS. 6A, 6B show a three-dimensional illustration of the fifth step of the assembly method according to the invention in a plan view and a sectional view.
Figure 6B:
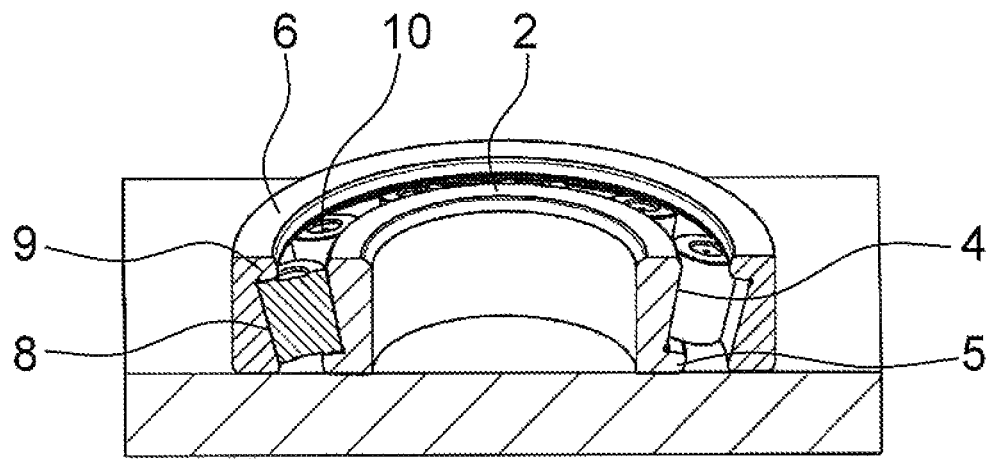

Subsequently, as can be seen from FIGS. 6A and 6B, in a fifth step, the inner bearing ring 2 is displaced into a coaxial position with respect to the outer bearing ring 3, in order to arrange the anti-friction rolling bodies 10 in a circumferentially uniformly distributed manner in their raceways 4, 8 in the bearing rings 2, 6 with cancelation of the ovalization of the outer bearing ring 3.

Figure 7A:
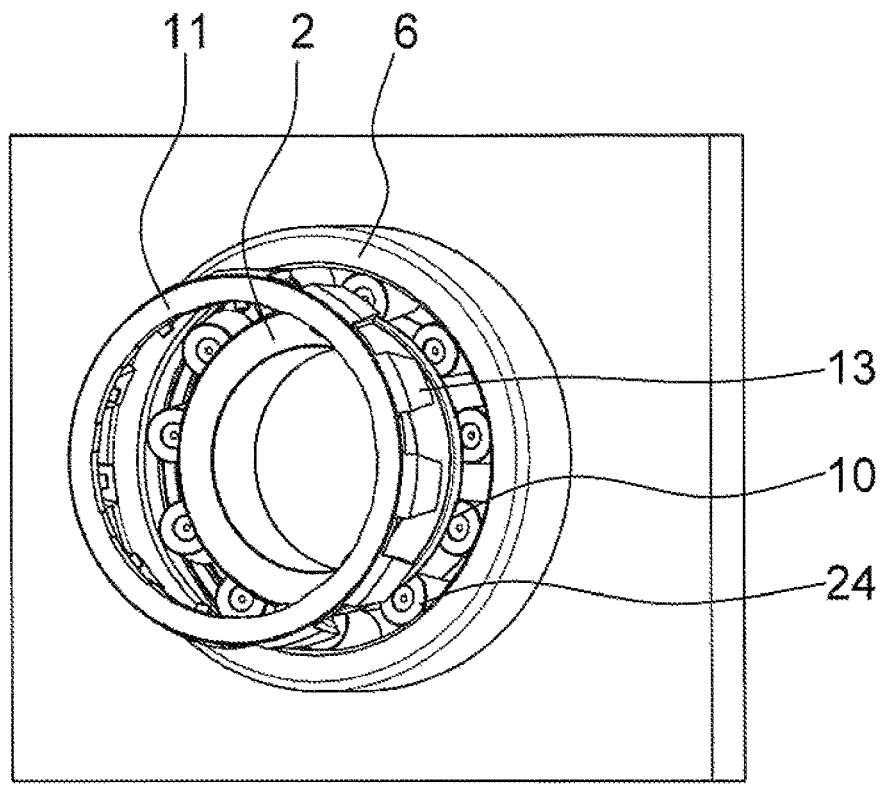
FIGS. 7A, 7B show a three-dimensional illustration of the sixth step of the assembly method according to the invention in a plan view and a sectional view.
Figure 7B:
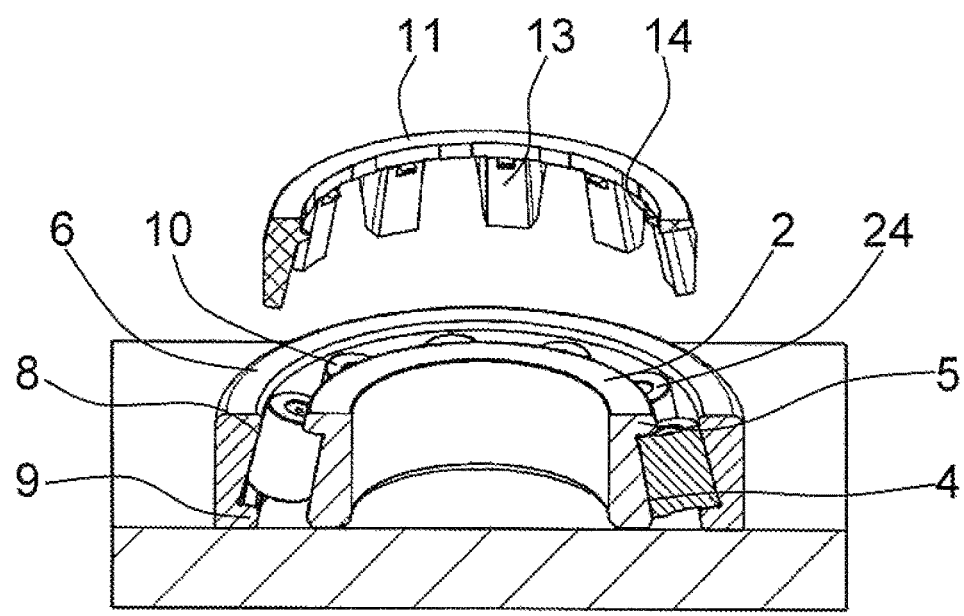

Afterward, in a sixth step, the bearing cage 11, as depicted in FIGS. 7A and 7B, is introduced with its cage crosspieces 13 between the anti-friction rolling bodies 10 from the side with their smaller end sides, and, as shown in FIG. 1, is latched on the inner bearing ring 2 by way of its latching lugs 14 on the inner face 15 of the rim 5. In this regard, it would be one variant which is not shown in the drawings for reasons of simplification to introduce the bearing cage 11 which is configured as a comb-type cage with its cage crosspieces 13 between the anti-friction rolling bodies 10 from the side with their larger end sides, and to latch it on the outer bearing ring 6 by way of latching webs on the inner face of the rim 9.

Figure 8:
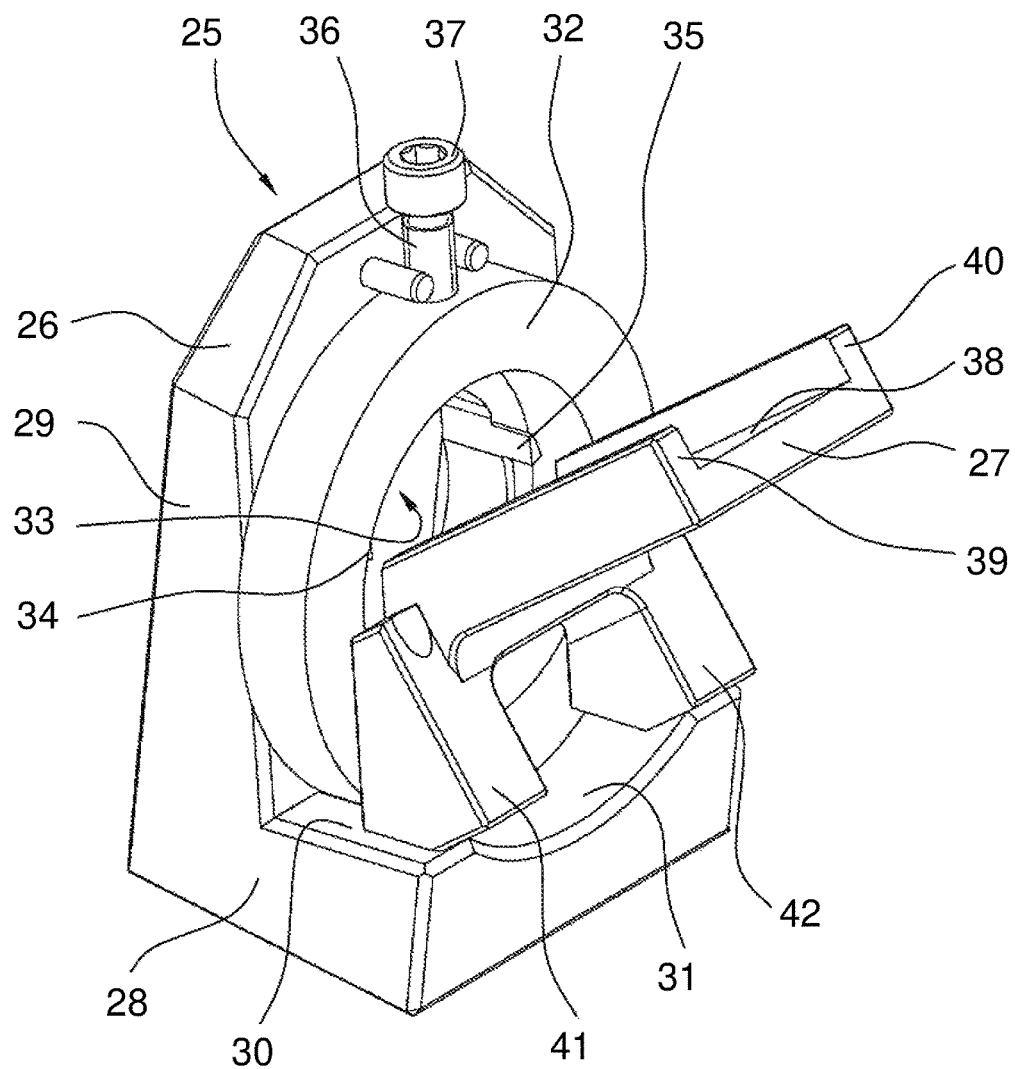
FIG. 8 shows a three-dimensional illustration of an apparatus for carrying out the assembly method according to the invention in a plan view.

Finally, FIG. 8 also shows the assembly apparatus 25 for carrying out the eccentric/pivot assembly method according to the invention. As can be clearly seen, said assembly apparatus 25 substantially comprises a perpendicular receiving part 26 for holding the outer bearing ring 6 and for filling it with the anti-friction rolling bodies 10, and of a ramp part 27 which is arranged opposite the receiving part 26 and in an inclined manner with respect thereto, via which ramp part 27 the inner bearing ring 2 is fed to the outer bearing ring 6.

Furthermore, it can be seen in FIG. 8 that the receiving part 26 has an L-shaped profile cross section with a horizontal or approximately horizontal leg 28 and a perpendicular or approximately vertical leg 29. Here, the surface 30 of the horizontal leg 28 is configured with a concave shaped-out formation 31 which runs to the vertical leg 29 for receiving a loose securing ring 32 for the outer bearing ring 6 in an upright manner, whereas the vertical leg 29 is configured with a circular aperture 33 with at least approximately the size of the inside diameter of the outer bearing ring 6, through which aperture 33 the anti-friction rolling bodies 10 can be introduced into the raceway 8 of the outer bearing ring 6.

Moreover, it can be seen from FIG. 8 that two stop webs 34, 35 which are arranged offset with respect to one another approximately by 190° and protrude into the loose securing ring 32 are fastened in the aperture 33 of the vertical leg 29, between which stop webs 34, 35 the roller set 18 which is fed to the outer bearing ring 6 can be fixed positionally in the latter.

It can likewise be clearly seen in FIG. 8 that a device for producing a vertical pressure force for the ovalization of the outer bearing ring 6 is fastened to the free end of the vertical leg 29 at the height of the 12 o'clock line of the peripheral surface of the loose securing ring 32, which device is configured as a sleeve 36 which is configured with an internal thread and in which a setting screw 37 is arranged in a rotatably movable manner.

Finally, it is also apparent from FIG. 8 that the ramp part 27 of the assembly apparatus 25 has an inclined planar sliding track 38 with two lateral guide rims 39, 40, the spacing of which from one another corresponds approximately to the outside diameter of the inner bearing ring 2. Here, the securing ring-side end of the sliding track 38 is fastened on two bearing blocks 41, 42 which can be fixed via a pin connection on the surface 30 of the horizontal leg 28 of the receiving part 26 in such a way that the sliding track 38 can be removed with said bearing blocks 41, 42 from the receiving part 26.

LIST OF DESIGNATIONS

1 Angular contact anti-friction bearing
2 Inner bearing ring
3 Tangent on the outer peripheral surface of 2
4 Inner raceway in 2
5 Rim on 4
6 Outer bearing ring
7 Tangent on the inner peripheral surface of 6
8 Outer raceway in 6
9 Rim on 8
10 Anti-friction rolling bodies
11 Bearing cage
12 Cage ring of 11
13 Cage crosspieces on 12
14 Latching lugs on 13
15 Inner face of 5
16 Rimless end side of 6
17 Outer peripheral surface of 6
18 Roller set
19 Larger end sides of 10
20 Rimless end side of 2
21 Contact point on 23
22 Contact point on 23
23 Running face of 10
24 Smaller end side of 10
25 Assembly apparatus
26 Receiving part of 25
27 Ramp part of 25
28 Horizontal leg of 26
29 Vertical leg of 26
30 Surface of 28
31 Concave shaped-out formation in 30
32 Securing ring of 26
33 Aperture in 29
34 Stop web in 33
35 Stop web in 33
36 Sleeve on 29
37 Setting screw in 36
38 Sliding track of 27
39 Guide rim on 38
40 Guide rim on 38
41 Bearing block on 38
42 Bearing block on 38
$A_L$ Bearing rotational axis
$\delta$ Cone angle
$\beta$ Envelope circle angle
$S_L$ Left-hand gap between 2 and 6
$S_R$ Right-hand gap between 2 and 6
$D_W$ Greatest diameter of 10
$h_{BI}$ Rim height on 2
$h_{BA}$ Rim height on 6

The invention claimed is:

1. An assembly apparatus for assembling an angular contact anti-friction bearing comprising an inner bearing ring with an inner raceway arranged on an outer peripheral surface thereof obliquely with respect to a bearing rotational axis and a rim which delimits said raceway at a smallest diameter thereof, an outer bearing ring with an outer raceway arranged on an inner peripheral surface thereof obliquely with respect to the bearing center axis and a rim which delimits said raceway at a greatest diameter, and a plurality of anti-friction rolling bodies arranged between the bearing rings that roll on the raceways and are held at uniform spacings from one another in a circumferential direction by a bearing cage, a tangent on the outer peripheral surface of the inner bearing ring and a tangent on the inner peripheral surface of the outer bearing ring formed flat at least in a region of the raceways extend in opposite directions obliquely with respect to the bearing rotational axis, in which the raceways in each of the two bearing rings are machined in a conical manner into said peripheral surfaces such that the rims which are produced and delimit the raceways in each case on one side are formed in one piece with the respective bearing rings, the assembly apparatus comprising: a vertical receiving part for holding the outer bearing ring and for filling the outer bearing ring with the anti-friction rolling bodies, and a ramp part arranged opposite the vertical receiving part at a fixed inclination angle with respect to the vertical receiving part for feeding the inner bearing ring to the outer bearing ring at the fixed inclination angle.

2. A method for assembling an angular contact anti-friction bearing comprising an inner bearing ring with an inner raceway arranged on an outer peripheral surface thereof obliquely with respect to a bearing rotational axis and a rim which delimits said raceway at a smallest diameter thereof, an outer bearing ring with an outer raceway arranged on an inner peripheral surface thereof obliquely with respect to the bearing center axis and a rim which delimits said raceway at a greatest diameter, and a plurality of anti-friction rolling bodies arranged between the bearing rings that roll on the raceways and are held at uniform spacings from one another in a circumferential direction by a bearing cage, a tangent on the outer peripheral surface of the inner bearing ring and a tangent on the inner peripheral surface of the outer bearing ring formed flat at least in a region of the raceways extend in opposite directions obliquely with respect to the bearing rotational axis, and the method comprising:
   machining the raceways in each of the two bearing rings in a conical manner into said peripheral surfaces such that the rims which are produced and delimit the raceways in each case on one side are formed in one piece with the respective bearing rings, and
   assembling the angular contact anti-friction bearing using an eccentric/pivot assembly method using the assembly apparatus of claim 1.

3. The method as claimed in claim 2, further comprising, in a first step, inserting the outer bearing ring with its rimless end side first into a receptacle in an at least approximately vertical position and, by application of a force on an outer peripheral surface of the outer bearing ring on a 12 o'clock line toward a 6 o'clock line, slightly ovalizing the outer bearing ring within elastic limit at the outer peripheral surface thereof.

4. The method as claimed in claim 3, further comprising, in a second step, filling the anti-friction rolling bodies either individually or as a roller set which has already been prefixed in a horseshoe-shaped manner in an auxiliary apparatus, with larger end sides of the anti-friction rolling bodies first, from a rimless end side of the outer bearing ring into the raceway of the outer bearing ring.

5. The method as claimed in claim 4, further comprising, in a third step, feeding the inner bearing ring from a position where it lies with a rimless end side thereof on an inclined plane to the outer bearing ring in a sliding manner such that the inner bearing ring comes into contact by way of two opposite points of the raceway thereof with two contact points on the running faces of two of said anti-friction rolling bodies.

6. The method as claimed in claim 5, further comprising, in a fourth step, swiveling the inner bearing ring about a horizontal axis formed between the two contact points on the anti-friction rolling bodies into the outer bearing ring into a perpendicular position with respect thereto by way of a centrifugal force which results from an acceleration on an inclined plane, in which perpendicular position the rim of the inner bearing ring bears at least in sections against smaller end sides of the anti-friction rolling bodies.

7. The method as claimed in claim 6, further comprising, in a fifth step, displacing the inner bearing ring into a coaxial position with respect to the outer bearing ring, and circumferentially distributing the anti-friction rolling bodies uniformly in the raceways in the bearing rings cancelling an ovalization of the outer bearing ring.

8. The method as claimed in claim 7, wherein the bearing cage is a comb-type cage and includes latching lugs, and the method further comprises, in a sixth step, introducing the bearing cage with cage crosspieces thereof between the anti-friction rolling bodies from a side with the smaller end sides, and latching the bearing cage on the inner bearing ring via the latching lugs engaging on an inner face of the rim.

9. The method as claimed in claim 7, wherein the bearing cage is a comb-type cage and includes latching webs, and the method further comprises, in a sixth step, introducing the bearing cage with cage crosspieces thereof between the anti-friction rolling bodies from a side with larger end sides of the anti-friction rolling bodies, and latching the bearing cage on the outer bearing ring via the latching webs engaging on an inner face of the rim.

10. The assembly apparatus as claimed in claim 1, wherein the receiving part has an L-shaped profile cross section with a horizontal leg and a vertical leg.

11. An assembly apparatus for assembling an angular contact anti-friction bearing comprising an inner bearing ring with an inner raceway arranged on an outer peripheral surface thereof obliquely with respect to a bearing rotational axis and a rim which delimits said raceway at a smallest diameter thereof, an outer bearing ring with an outer raceway arranged on an inner peripheral surface thereof obliquely with respect to the bearing center axis and a rim which delimits said raceway at a greatest diameter, and a plurality of anti-friction rolling bodies arranged between the bearing rings that roll on the raceways and are held at uniform spacings from one another in a circumferential direction by a bearing cage, a tangent on the outer peripheral surface of the inner bearing ring and a tangent on the inner peripheral surface of the outer bearing ring formed flat at least in a region of the raceways extend in opposite directions obliquely with respect to the bearing rotational axis, in which the raceways in each of the two bearing rings are machined in a conical manner into said peripheral surfaces such that the rims which are produced and delimit the raceways in each case on one side are formed in one piece with the respective bearing rings, the assembly apparatus comprising: a vertical receiving part for holding the outer bearing ring and for filling the outer bearing ring with the anti-friction rolling bodies, and a ramp part arranged opposite the vertical receiving part in an inclined manner with respect thereto for feeding the inner bearing ring to the outer bearing ring, the receiving part has an L-shaped profile cross section with a horizontal leg and a vertical leg, and a surface of the horizontal leg is configured with a concave formation which runs to the vertical leg for receiving a loose securing ring for the outer bearing ring in an upright manner.

12. The assembly apparatus as claimed in claim 11, wherein the vertical leg is configured with a circular aperture with at least approximately a size of an inside diameter of the outer bearing ring, through which aperture the anti-friction rolling bodies are introducible into the raceway of the outer bearing ring.

13. The assembly apparatus as claimed in claim 12, further comprising two stop webs which are arranged offset with respect to one another approximately by 190° and protrude into the loose securing ring fastened in the aperture of the vertical leg, between which stop webs the roller set which is fed to the outer bearing ring positionally fixable.

14. The assembly apparatus as claimed in claim 13, further comprising a device for producing a vertical pressure force for ovalization of the outer bearing ring fastened to a free end of the vertical leg at a height of a 12 o'clock line of a peripheral surface of the loose securing.

15. The assembly apparatus as claimed in claim 14, wherein the ramp part has an inclined planar sliding track with two lateral guide rims, a spacing of the lateral guide rims from one another corresponds approximately to an outside diameter of the inner bearing ring.

16. The assembly apparatus as claimed in claim 15, wherein a securing ring-side end of the sliding track is fastened on two bearing blocks, and the sliding track is removably fixable via said bearing blocks on a surface of the horizontal leg of the receiving part.

* * * * *